(12) United States Patent
Umeda et al.

(10) Patent No.: US 7,819,422 B2
(45) Date of Patent: Oct. 26, 2010

(54) VEHICLE OCCUPANT RESTRAINT APPARATUS

(75) Inventors: Hideki Umeda, Tokyo (JP); Atsushi Nishikawa, Kariya (JP); Teruji Kuroyanagi, Kariya (JP); Yasunari Sakai, Kariya (JP)

(73) Assignee: Takata Corporation, Tokyo (JP)

( * ) Notice: Subject to any disclaimer, the term of this patent is extended or adjusted under 35 U.S.C. 154(b) by 221 days.

(21) Appl. No.: 12/086,485

(22) PCT Filed: Dec. 13, 2006

(86) PCT No.: PCT/JP2006/324846

§ 371 (c)(1), (2), (4) Date: Jun. 13, 2008

(87) PCT Pub. No.: WO2007/074648

PCT Pub. Date: Jul. 5, 2007

(65) Prior Publication Data

US 2009/0267331 A1    Oct. 29, 2009

(30) Foreign Application Priority Data

Dec. 28, 2005 (JP) .............................. 2005-378450

(51) Int. Cl.
B60R 21/21 (2006.01)
(52) U.S. Cl. .................. 280/730.2; 280/728.2
(58) Field of Classification Search .............. 280/730.2, 280/728.2
See application file for complete search history.

(56) References Cited

U.S. PATENT DOCUMENTS

| | | | |
|---|---|---|---|
| 6,234,517 B1 * | 5/2001 | Miyahara et al. ......... | 280/730.2 |
| 6,254,123 B1 * | 7/2001 | Urushi et al. ............ | 280/730.2 |
| 6,293,581 B1 * | 9/2001 | Saita et al. .............. | 280/730.2 |
| 6,305,707 B1 * | 10/2001 | Ishiyama et al. ......... | 280/728.2 |
| 6,644,687 B2 * | 11/2003 | Saito et al. .............. | 280/730.2 |
| 7,121,579 B2 * | 10/2006 | Ochiai et al. ............. | 280/730.2 |
| 7,159,896 B2 * | 1/2007 | Ochiai et al. ............. | 280/730.2 |
| 7,168,735 B2 * | 1/2007 | Kino et al. .............. | 280/730.2 |
| 7,175,196 B2 * | 2/2007 | Boxey .................... | 280/730.2 |
| 7,264,267 B2 * | 9/2007 | Kino et al. .............. | 280/728.2 |
| 7,273,228 B2 * | 9/2007 | Noguchi et al. .......... | 280/730.2 |
| 7,306,258 B2 * | 12/2007 | Noguchi et al. .......... | 280/730.2 |
| 7,309,078 B2 * | 12/2007 | Nagata .................... | 280/728.2 |
| 7,331,598 B2 * | 2/2008 | Inazu et al. ............. | 280/728.2 |
| 7,338,071 B2 * | 3/2008 | Noguchi et al. .......... | 280/730.2 |
| 7,547,038 B2 * | 6/2009 | Coleman ................. | 280/728.2 |

(Continued)

FOREIGN PATENT DOCUMENTS

EP    0 980 796 A2    2/2000

(Continued)

*Primary Examiner*—Paul N Dickson
*Assistant Examiner*—Nicole Verley
(74) *Attorney, Agent, or Firm*—Foley & Lardner LLP

(57) ABSTRACT

A vehicle occupant restraint apparatus is provided that can restrict the movement of the rear end side of an airbag to the outside of a vehicle. A folded body of the airbag 1 is installed along a roof side rail 3 and is inflatable by means of at least one inflator 4. Guide plates for guiding the extension of the airbag are provided on the roof side rail 3 above each pillar. An extended piece 1c of the airbag 1 is fastened to the rearmost guide plate 7, and thereby the movement of the inflated airbag 1 toward the outside of the vehicle is restricted.

6 Claims, 2 Drawing Sheets

U.S. PATENT DOCUMENTS

| | | | |
|---|---|---|---|
| 7,607,685 B2 * | 10/2009 | Jang et al. | 280/730.2 |
| 2005/0046154 A1 * | 3/2005 | Rhea et al. | 280/728.2 |
| 2006/0267315 A1 * | 11/2006 | White, Jr. | 280/730.2 |
| 2007/0164544 A1 * | 7/2007 | Fulmer et al. | 280/730.2 |
| 2009/0127836 A1 * | 5/2009 | Umeda et al. | 280/730.2 |

FOREIGN PATENT DOCUMENTS

| | | |
|---|---|---|
| EP | 1 655 182 A2 | 5/2006 |
| JP | 2001-97171 | 4/2001 |
| JP | 2003-34209 | 2/2003 |
| JP | 2003-95052 | 4/2003 |
| JP | 2003-306117 | 10/2003 |
| JP | 2003-327067 | 11/2003 |
| JP | 2004-314786 | 11/2004 |
| JP | 2005-14908 | 1/2005 |

* cited by examiner

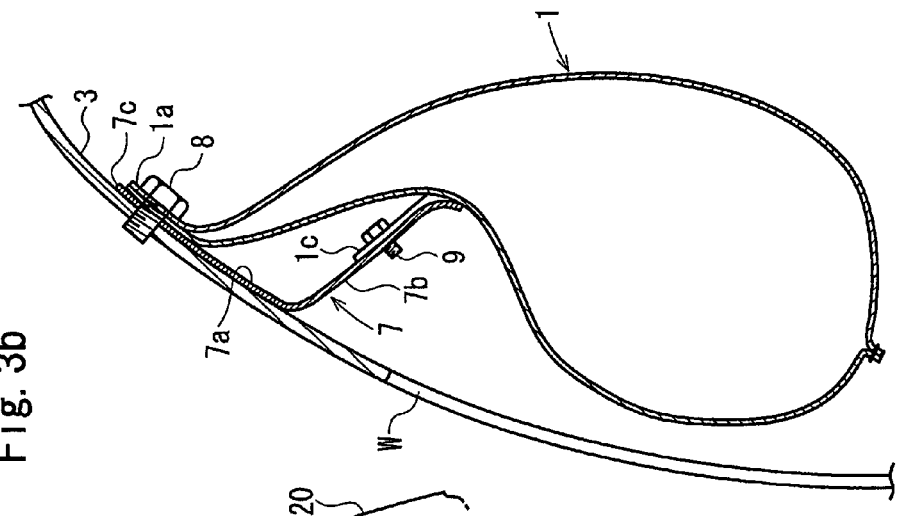
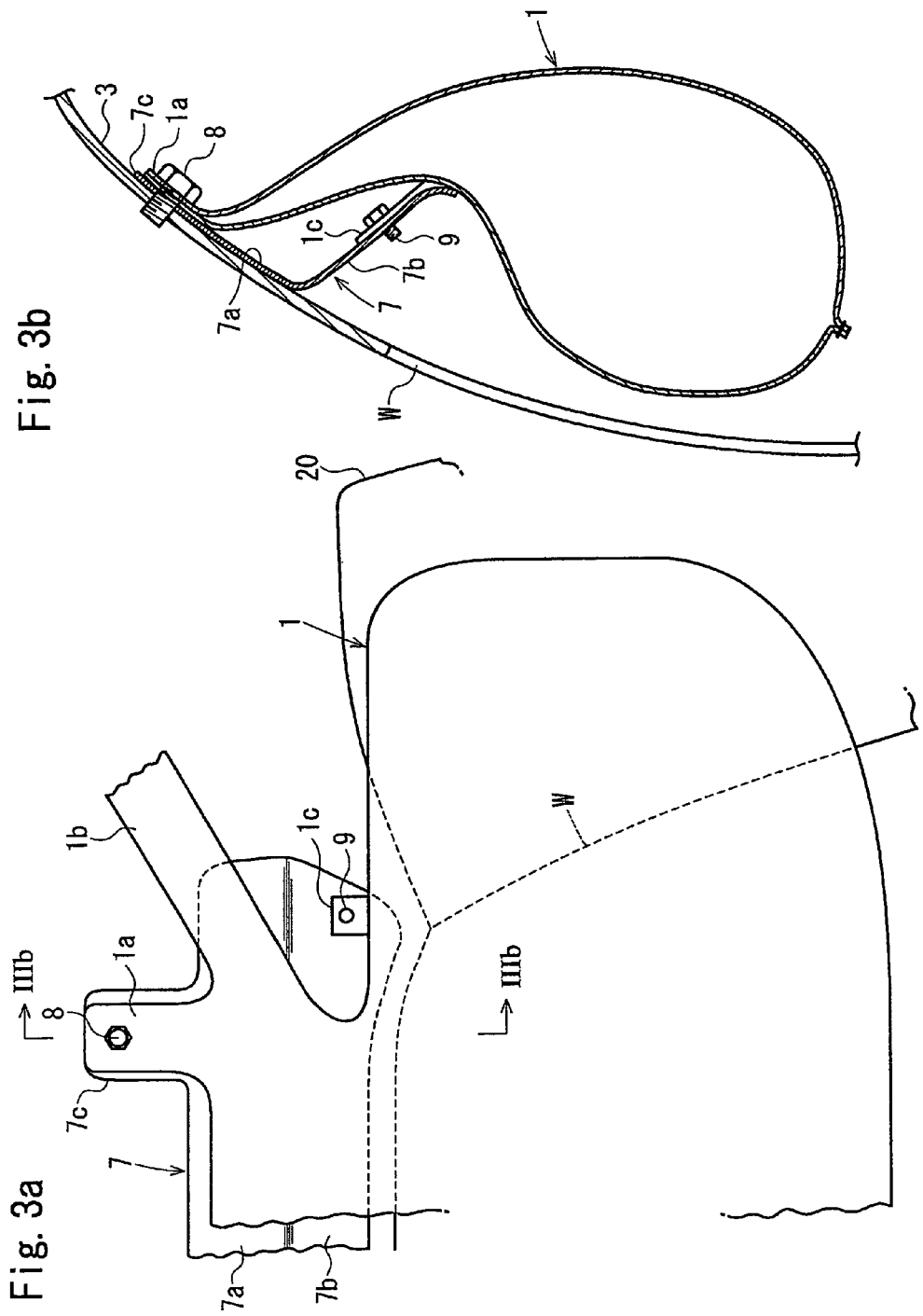

VEHICLE OCCUPANT RESTRAINT APPARATUS

TECHNICAL FIELD

The present invention relates to a vehicle occupant restraint apparatus for restraining the head of a vehicle occupant, more specifically to a vehicle occupant restraint apparatus having an airbag that is inflated along a side door window or the like in the event of a side collision, a lateral overturn, or the like of a vehicle.

BACKGROUND ART

As an airbag for restraining the head of a vehicle occupant, there is known an airbag (curtain airbag) that is disposed in the vicinity of a corner portion in a vehicle cabin, in which a ceiling portion and a side face portion thereof intersect, and is configured so as to be inflated along a side door window or the like by means of gas introduced through a gas introduction port.

In a vehicle equipped with a vehicle occupant restraint apparatus having such a curtain airbag, in the event that the vehicle suffers a side collision, a lateral overturn, or the like, the curtain airbag is inflated toward a lower position of the vehicle body along a side face (for example, a door, a pillar, or the like) in the vehicle cabin to restrain the head of an occupant.

In Japanese Unexamined Patent Application Publication No. 2003-34209, there is described that a cloth (called "support portion" in the bulletin) separated from an airbag is provided in an outdoor side face of the curtain airbag on its rear end side. The support portion restricts the movement of the inflated airbag to the outside of the vehicle.

In Japanese Unexamined Patent Application Publication No. 2001-97171, there is described that a guide plate (called "jump board" in the bulletin) for guiding the expansion of a curtain airbag is provided to a roof side rail to prevent the curtain airbag from interfering with an upper portion of a C-pillar garnish when it is inflated.

[Patent Document 1] Japanese Unexamined Patent Application Publication No. 2003-34209
[Patent Document 1] Japanese Unexamined Patent Application Publication No. 2001-97171

If a support portion composed of a cloth separated from an airbag is attached to the airbag, as disclosed in Japanese Unexamined Patent Application Publication No. 2003-34209, the weight and the folded volume of the airbag become large in vain.

SUMMARY OF THE INVENTION

An object of the present invention is to provide a vehicle occupant restraint apparatus that enables to restrict the movement of the rear end side of an airbag to the outside of a vehicle without using the above support portion.

A vehicle occupant restraint apparatus of the present invention is characterized in having an airbag installed along the top edge side of the periphery of a side window of a vehicle, the airbag being in a state of being folded, at least one inflator for inflating the airbag, and a guide plate installed above a pillar garnish of the rearmost pillar of the vehicle, the guide plate extending inside the vehicle cabin so as to guide the airbag toward the interior of the cabin; wherein the vehicle rear end side of the airbag is secured to the guide plate.

The rear end side of the airbag may be secured to the rear end side of the guide plate.

The airbag may be provided with an extended piece in its rear end side, and the extended piece may be secured to the guide plate.

BRIEF DESCRIPTION OF DRAWINGS

FIG. 1 is a side view of the inside of a vehicle cabin provided with a vehicle occupant restraint apparatus according to an embodiment of the present invention.
FIG. 2 is an explanatory drawing of the airbag in FIG. 1, when it is inflated.
[FIG. 3]
FIG. 3a is an enlarged view of a portion of FIG. 2,
and FIG. 3b is a cross-section view taken along line IIIb-IIIb of FIG. 3a.

DETAILED DESCRIPTION

In a vehicle occupant restraint apparatus of the present invention, the rear end side of an airbag is attached to a guide plate and thereby the rear end side of the airbag is restricted from moving toward the outside of the vehicle.

An embodiment of the present invention will now be described with reference to the attached drawings.

Figure 1:
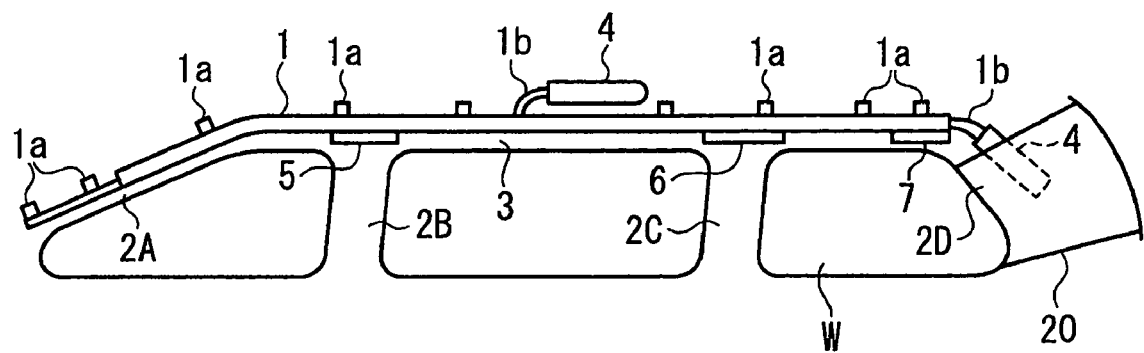
[FIG. 1]
Figure 2:
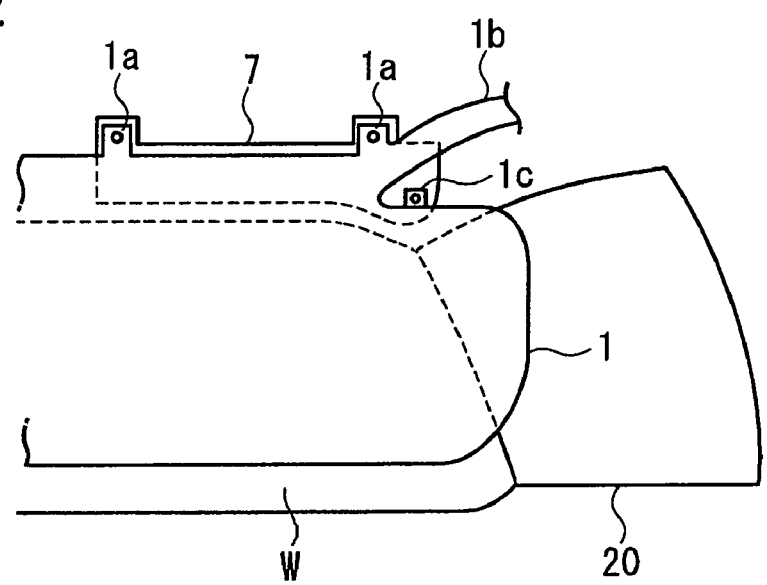
[FIG. 2]

FIG. 1 is a side view of the inside of a vehicle cabin provided with a vehicle occupant restraint apparatus according to an embodiment of the present invention, FIG. 2 is an elevation view of the rear end side of the airbag in FIG. 1 when it is inflated, FIG. 3a is an enlarged view of the inside of the vehicle cabin when the airbag in FIG. 1 is inflated, and FIG. 3b is a cross-section view taken from line IIIb-IIIb of FIG. 3a. Note that the "front and rear" in the following description conform to the front and rear of a vehicle body.

As shown in FIG. 1, the body of a vehicle equipped with the vehicle occupant restraint apparatus includes an A-pillar 2A to a D-pillar 2D, a roof side rail 3, and the like; on the D-pillar 2D, a D-pillar garnish 20 is attached. There is provided with a roof lining (not shown) along the ceiling of the vehicle body.

The vehicle occupant restraint apparatus has an airbag (curtain airbag) 1 and a pair of inflators 4 for inflating the airbag 1, the airbag being folded into a slender form.

The airbag is installed so as to extend from around the upper portion of the A-pillar 2A to around the upper portion of the D-pillar 2D via the roof side rail 3. The airbag is constructed by sewing piled plural base clothes so as to introduce gas from each of the inflators 4 through a projected gas introduction port 1b having a cylindrical shape. It should be noted that although the gas introduction ports 1b are provided at two places in a midway and a rear portion in the front and rear direction in this embodiment, it is not limited to this arrangement.

There are provided a plurality of ear-like lugs 1a at predetermined distances so as to be projected from the top edge of the airbag 1, and each of the lugs 1a is fastened to the roof side rail 3 using a fastener such as a bolt, a rivet, or the like. The airbag 1 has such a size as to be able to cover the substantially entire openings of side windows from around the A-pillar 2A to around the D-pillar 2D when it is inflated.

The interior side of each of the B-pillar 2B, C-pillar 2C and D-pillar 2D is covered with a pillar garnish; a numerical character 20 stands for the D-pillar 2D. The top end of each of the pillar garnishes reaches immediately close to the roof side rail 3.

In respective portions of the roof side rail 3 above the B-pillar 2B, C-pillar 2C and D-pillar 2D, there are provided guide plates 5, 6 and 7 for guiding the airbag 1 under being inflated into an interior of the cabin without interfering with the upper end of each of the pillar garnishes. The guide plates 5, 6 and 7 are disposed apart from each other.

The guide plate 7 is constituted of a substantially L-shaped plate member including a vertical plate portion 7a having a vertically directed surface and overlapping with the roof side rail 3, an inclined plate portion 7b extending diagonally downward from the bottom edge of the vertical plate portion 7a, and a pair of projected portions 7c projected upward from the vertical plate portion 7a. Although not shown, each of the guide plates 5 and 6 is a member having a shape similar to the guide plate 7. The tip end side of the inclined plate portion 7b in its extending direction is positioned above the top end of the D-pillar garnish 20.

The projected portions 7c are each provided with a bolt insertion hole. The guide plate 7 and the rear end side of the airbag 1 are mounted to the roof side rail 3 in a manner such that the lugs 1a of the airbag are superposed on the projected portions 7c, respectively, and bolts 8 are each screwed into the roof side rail 3 through the lug 1a and projected portion 7c.

As shown in FIG. 2 and FIG. 3a, one of the gas introduction ports 1b extends rearward from a portion of the top edge of the airbag 1, the portion being slightly apart forward from the rearmost end of the airbag 1. In this embodiment, the rearmost lug 1a is disposed in a place substantially vertically above the gas introduction port 1b.

There is provided an extended piece 1c so as to be projected from a portion of the top edge of the airbag 1 slightly apart rearward from this gas introduction port 1b. The extended piece 1c has a substantially rectangular shape and is provided with a bolt insertion hole. The extended piece 1c is disposed in a position that overlaps the inclined plate portion 7b in the state when the airbag 1 is inflated. This extended piece 1c is superposed on the top face of the inclined plate portion 7b of the guide plate 7 and is mounted to the inclined plate portion 7b using a bolt 9.

This airbag 1 is, although not shown, configured into a folded slender body by being folded a plurality of times zigzag along folding lines in a front and rear direction in an accordion-like manner. This folded body is bound by at least one binding member such as a nonwoven cloth cover, tape, or the like, which can be ruptured, to be kept in shape.

As shown in FIG. 1, the lugs 1a projected from the folded slender body of the airbag 1 are fastened to the roof side rail 3. Moreover, at that time, the guide plate 7 is also fixed to the roof side rail 3, to which the extended piece 1c is fastened. This airbag 1 is kept out of view by being covered with the roof lining.

In the vehicle occupant restraint apparatus thus configured, the inflators 4 are activated in the event of a side collision, a lateral overturn, or the like of the vehicle, and then the airbag 1 begins to be inflated. This airbag 1 pushes the roof lining to open and commences being inflated into the interior of the vehicle cabin as being guided by the guide plates 5, 6 and 7, and then it is fully inflated to extend along the side surface of the vehicle cabin.

Since the extended piece 1c of the airbag 1 is fastened to the guide plate 7 in this vehicle occupant restraint apparatus, there is little chance that the rear end side of the airbag 1 will extend outwardly beyond the bottom edge of the guide plate 7, as shown in FIG. 3a. Therefore, even if the window W between the C-pillar 2C and the D-pillar 2D is opened, the movement of the airbag 1 to the outside of the vehicle is restricted.

The embodiment described above represents an example of the present invention, and the present invention is not limited to the embodiment described above. For example, the number of the inflators may be one, or three or more. Moreover, although the rearmost pillar is a D-pillar in the embodiment described above, it can be a B-pillar or a C-pillar.

It should be noted that this patent application is based on the patent application in Japan applied on Dec. 28, 2005 (Japanese Patent Application No. 2005-378450) and is assisted by reference to the whole thereof.

The invention claimed is:

1. A vehicle occupant restraint apparatus comprising:
    an airbag installed along a top edge side of a periphery of a side window of a vehicle in a state of being folded;
    at least one inflator for inflating the airbag; and
    a guide plate installed above a pillar garnish of a rearmost pillar of the vehicle and extending to an inside of a vehicle cabin so as to guide the airbag toward the inside of the cabin;
    wherein a vehicle rear end side of the airbag is fixed to the guide plate,
    wherein the guide plate includes a vertical plate portion having a vertically directed surface, an inclined plate portion extending diagonally downward from a bottom edge of the vertical plate portion to the inside of the vehicle cabin, and at least one projected portion projected upward from the vertical plate portion, the projected portion being fastened to a roof side rail of the vehicle, and
    wherein the airbag is provided with an extended piece so as to be projected upward from a top edge thereof, the extended piece being provided in a position that overlaps the inclined plate portion in the state when the airbag is inflated, and the extended piece is fastened to the inclined plate portion.

2. The vehicle occupant restraint apparatus according to claim 1, wherein the rear end side of the airbag is fixed to a rear end side of the guide plate.

3. The vehicle occupant restraint apparatus according to claim 1, wherein the airbag is provided with the extended piece in its rear end side, the extended piece being attached to the guide plate.

4. The vehicle occupant restraint apparatus according to claim 1, wherein the airbag is folded into a slender form so as to extend in a front and rear direction of the vehicle, and is bound by at least one binding member.

5. The vehicle occupant restraint apparatus according to claim 1, wherein the airbag has a plurality of lugs projected upward from the top edge thereof, at least one of the lugs being fastened to the roof side rail together with the projected portion.

6. The vehicle occupant restraint apparatus according to claim 1, wherein a plurality of guide plates are disposed with a distance therebetween.

* * * * *